United States Patent

Mandal et al.

[11] Patent Number: 5,960,454
[45] Date of Patent: Sep. 28, 1999

[54] AVOIDING CACHE COLLISIONS BETWEEN FREQUENTLY ACCESSED, PINNED ROUTINES OR DATA STRUCTURES

[75] Inventors: Manas Mandal; Michael John Martino; Bruce Lee Worthington, all of Austin, Tex.

[73] Assignee: International Business Machines Corporation, Armonk, N.Y.

[21] Appl. No.: 08/772,048

[22] Filed: Dec. 19, 1996

[51] Int. Cl.$^6$ .................................................. G06F 12/08
[52] U.S. Cl. ............................................ 711/118; 711/171
[58] Field of Search ............................. 711/3, 117, 118, 711/133, 147, 171

[56] References Cited

U.S. PATENT DOCUMENTS

| | | | |
|---|---|---|---|
| 5,001,665 | 3/1991 | Gergen et al. | 711/207 |
| 5,349,656 | 9/1994 | Kaneko et al. | 395/672 |
| 5,630,097 | 5/1997 | Orbits et al. | 711/165 |
| 5,651,135 | 7/1997 | Hatakeyama | 711/128 |
| 5,752,261 | 5/1998 | Cochcroft, Jr. | 711/133 |

OTHER PUBLICATIONS

Profile Guided Code Positioning, Karl Pettis and Robert C. Hansen, Hewlett–Packard Company, California Language Laboratory, proceedings of the ACM SIGPLAN'90 Conference.

Analysis of Techniques to IMprove Protocol Processing Latency, David Mosberger, Larry L. Peterson, Patrick G. Bridges, and Sean O'Malley, Dept. of Computer Science University of Arizona. (Date Unknown).

Improving Instruction Cache Behavior by Reducing Cache Pollution, Rajiv Gupta, Dept. of computer Science University of Pittsburgh, Chi–Hung Chi, Philips Laboratories North American Philips Corp. (Date Unknown).

Technical Disclosure Bulletin, vol. 36 No. 04 Apr. 1993, Arbitrary Congruence Class Assignment.

Technical Disclosure Bulletin, vol. 27 No. 2 Jul. 1984, XOR Randomization in Cache Congruence Class Indexing.

Technical Disclosure Bulletin, vol. 31 No. 1 Jun. 1988, Improved Hash and Index Searching Techniques For Computers Using A Cache And/Or Virtual Memory.

*Primary Examiner*—Eddie P. Chan
*Assistant Examiner*—Gary J. Portka
*Attorney, Agent, or Firm*—Jeffrey S. Labaw

[57] ABSTRACT

The performance of a computer system having a faster memory unit and a slower memory unit is improved. Memory locations of the faster memory unit are shared by a plurality of memory locations of the slower memory unit. The frequently accessed routines and data structures in the system are identified. The size of each frequently accessed routine is determined. Each routine is associated with a Moment Value computed according to a size of each routine and a frequency of access of the routine. The Moment Values and the associated routines are sorted in descending order in a sorted Moment Value list so that the routine with the largest Moment Value is first in the sorted Moment Value list. The associated routines are arranged in the order of decreasing Moment Value at memory locations in the slower memory unit of the computer.

The performance of the program running on the computer system is improved by reducing contention for faster memory space among the frequently accessed routines.

14 Claims, 5 Drawing Sheets

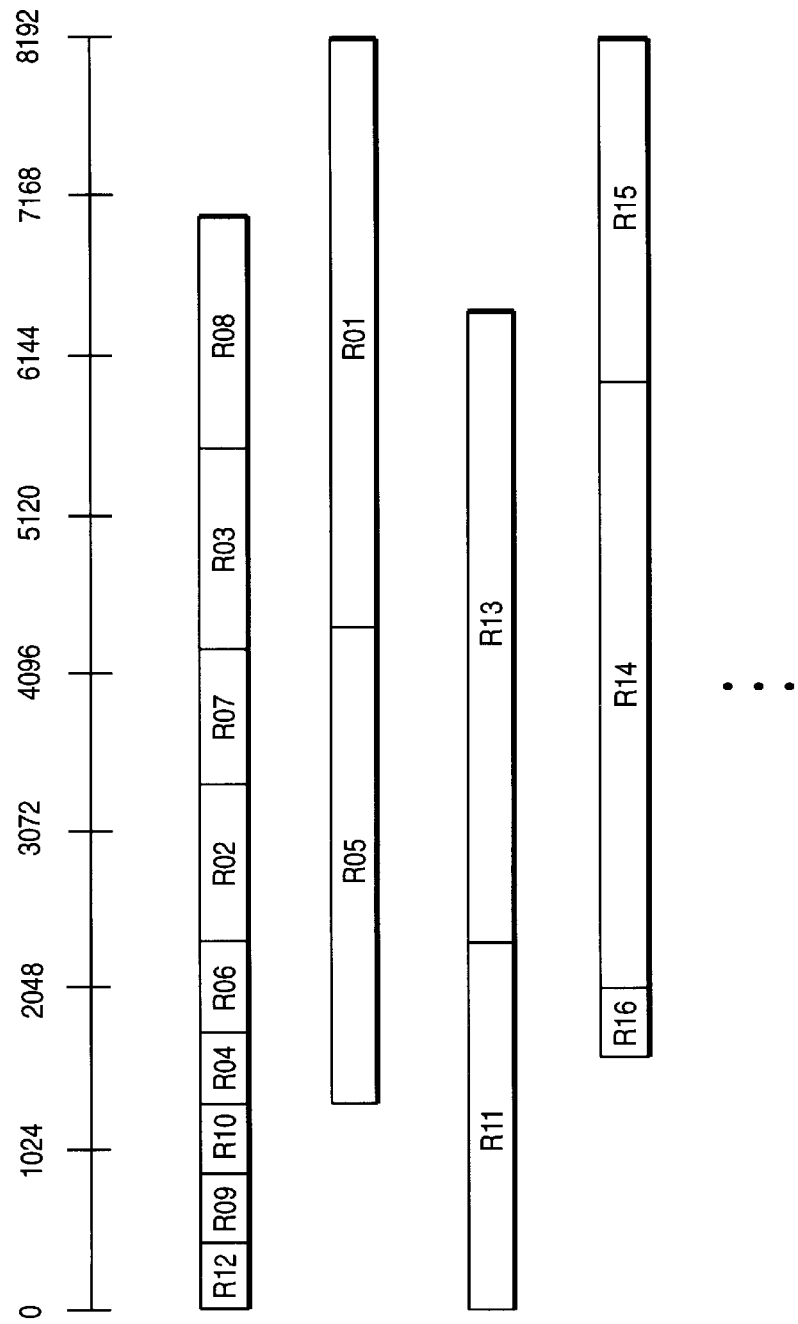

5,960,454

AVOIDING CACHE COLLISIONS BETWEEN FREQUENTLY ACCESSED, PINNED ROUTINES OR DATA STRUCTURES

BACKGROUND OF THE INVENTION

This invention relates generally to storing pinned programs and data structures in the cache of a data processing system. More particularly, it relates to avoiding cache collisions between high frequency pinned routines and data by loading these routines and data at noncompetitive memory locations.

It is becoming increasingly true that the performance, i.e. speed of execution, of programs running on modern digital computers is dominated by several effects which are largely unrelated to the actual instructions or sequences of instructions executed. Rather, performance has become dependent on the physical positions at which the routines and data are stored within the memory hierarchies of the machines at the time when the routines and data are required for processing by the Central Processing Unit (CPU).

In stored program digital computers, memory typically forms a hierarchy with multiple levels, e.g., the hard disk, the main memory, and the registers of the CPU, along with one or more levels of intermediate cache between the main memory and the CPU. The discussion below assumes at least one level of cache exists between main memory and the CPU. There is a direct relationship between the speed of such memory and its cost; faster memory is more expensive. Of course, programs executing instructions on machines with fast memory take less time than those executing on machines with slow memory and, as a result, users of computers are desirous of running their programs on machines with the fastest memories that they can afford to use for their particular application. There is strong motivation on the part of computer designers to arrange their machines so as to achieve the best possible trade-off of cost for speed. It is precisely this cost versus speed compromise which has led computer designers to a hierarchical structure for the memory component of the stored program digital computer.

It is typically a characteristic of the main memory component that it will be large, slow and inexpensive in comparison to the cache memory component. An order of magnitude difference in cost and speed between the main memory and the cache is not uncommon; in size, there are ordinarily several orders of magnitude difference between the main memory and cache, with the cache being the smaller of the two. Again, as noted above, this size difference is driven by the cost of the higher speed cache memory as compared to the cost of the main memory.

The Central Processing Unit (CPU) will typically operate at speeds which are significantly faster than the main memory. As noted earlier, the speed of the memory determines the rate at which instructions and data can be fetched from the memory and delivered to the CPU for processing. Given the relative costs of the cache memory as compared to the main memory, the cache memory will be much smaller.

As main memory is a limited resource, only a fraction of the total set of instructions and data can be loaded into memory at any given time. Similarly, only a fraction of main memory can be stored in any one of the caches. In addition, the caches may have restrictions on where the data stored at particular main memory locations can be concurrently stored. Given that main memory is much larger than the cache, and given that an algorithm exists that maps each block from the main memory into one or more specific locations within the cache, each location in the cache either holds one of the allowable blocks from main memory, as specified by the mapping algorithm, or the cache location is marked as invalid. The speed of the memory determines the rate at which instructions and data can be fetched from the memory and delivered to the CPU for processing.

When the computer has reached a steady state, the CPU is fetching instructions and data from the cache, the majority of the cache locations contain valid instructions and data, and the CPU requires yet one more block from main memory to continue execution of the program. At this point, the control hardware for the cache selects from the allowable cache locations one block of data to be replaced or overwritten by the new block from main memory. The specific implementation of the cache determines which locations are allowed to contain the new block of instructions or data, based on the location of the block in main memory, i.e. the block's address in main memory. The system then fetches from main memory and loads those bytes into the chosen location of the cache. It is at this point that the problem addressed by this invention arises.

Since each of the cache locations typically map multiple addresses within main memory, the system may need to overwrite some of the instructions or data already in the cache to get the new instructions or data into the cache. When frequently accessed instructions or data overwrite infrequently accessed instructions or data, the impact of a "re-fetch" on the performance of the system is small; this is true since infrequently used instructions or data are used infrequently. However, when frequently used instructions or data are overwritten, the effect on system or application performance can be large. When the particular block of frequently accessed instructions or data are next needed, they will have to be re-fetched from main memory and will in turn overwrite something else in the cache. If the mapping of main memory blocks to cache locations does not permit certain frequently accessed routines data to reside concurrently in the cache, the cache will begin to "thrash," which is as bad as it sounds. Cache thrashing occurs when the system, due to the placement of frequently accessed instructions or data in main memory, repeatedly invalidates and overwrites those instructions or data within the cache.

Thus, it would be advantageous to develop a scheme for minimizing the probability that frequently accessed routines and data structures are repeatedly overwritten. This invention comprises one such scheme for routines and data structures that are pinned to particular addresses in main memory, e.g., during the building of an operating system kernel.

SUMMARY OF THE INVENTION

Therefore, it is an object of this invention to place pinned routines of instructions of particular sizes to improve the performance of those routines, and the programs of which they are a part.

It is another object of the invention to avoid cache collisions between frequently accessed routines.

It is another object of the invention to strategically locate data for split cache systems, which have separate cache locations for instructions and data, and for unified cache systems.

It is another object of the invention to improve performance by eliminating certain of the impediments to speed of processing.

These and other objects are accomplished by a process of loading frequently accessed routines and data into main memory at locations which reduce the statistical likelihood that they will compete with each other for cache space. In general, this is accomplished by selecting a specific load ordering and main memory placement at link time. There are two aspects which deserve consideration. The best results will be obtained when due consideration is given to two separate but equally important parameters associated with the routines or data.

The performance of a computer system having a faster memory unit and a slower memory unit is improved. Memory locations of the faster memory unit are shared by a plurality of memory locations of the slower memory unit. The frequently accessed routines in the system are identified. The size of each frequently accessed routine is determined. Each routine is associated with a Moment Value computed according to a size of each routine and a frequency of access of the routine. The Moment Values and the associated routines are sorted in descending order in a sorted Moment Value list so that the routine with the largest Moment Value is first in the sorted Moment Value list. The associated routines are arranged in the order of decreasing Moment Value at memory locations in the slower memory unit of the computer. The performance of the program running on the computer system is improved by reducing contention for cache memory space among the frequently accessed routines.

A program designed with an understanding of the memory hierarchies according to the present invention will be arranged so that the routines of instructions are stored in certain of the memory locations so that the speed with which the routines of instructions execute will, with a very high probability, be faster than that which would be achieved either by chance or without the knowledge of the invention.

Furthermore, the invention is additive with other known methods of performance improvements which relate to caches, such as instruction stream rearrangements, and generally to other stored program digital computer performance improvements.

In some computer systems, one or more of the memory components in the memory hierarchy may be split into two parts, with each part being used exclusively for the storage of instructions or data. Also, the cache is frequently split into two or more levels of cache and designated L1, L2, L3 and so forth. As described herein, the methods of this invention may be applied equally well to either or both parts of a split cache and multiple cache levels and will provide good results. In those cases where there are pinned routines which are frequently accessed, such as might occur for basic operating system kernel operations, the methods of this invention may be applied to those routines to reduce their execution time. Similarly, in those cases where there are data structures that are frequently accessed, such as might occur in certain of the control information of an operating system or application for example, the methods may also be applied to that data to reduce the execution time of the programs accessing such data.

BRIEF DESCRIPTION OF THE DRAWINGS

These objects, features and advantages will be more readily understood with reference to the attached figures and following description.

FIG. 4 is an example worksheet for packing main memory according to the calculated moments of routines.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention.

Figure 1:
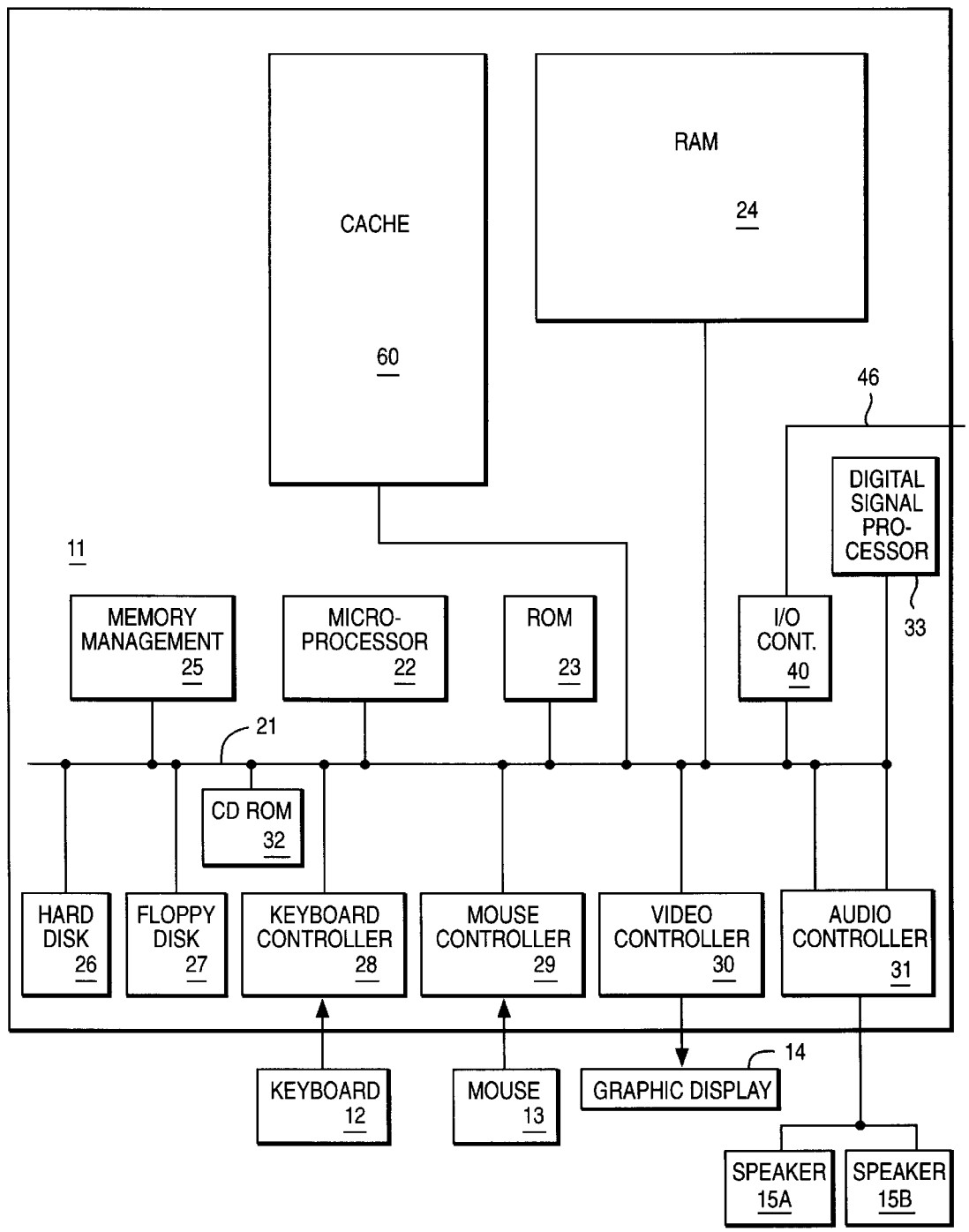
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23, random access memory (RAM) 24, and cache memory 60 also connected to system bus 21. A microprocessor in the IBM PC series of computers is one of the Intel family of microprocessors including the 386, 486 or Pentium (TM) microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other RISC chips made by Hewlett Packard, Sun, Motorola and others may be used in the specific computer.

The ROM 23 contains among other code the Basic Input/Output system (BIOS) which controls basic hardware operations such as the interaction with the disk drives and the keyboard. The RAM 24 is the main memory into which the operating system and application programs are loaded. The cache 60 contains the instructions and data required for execution by the microprocessor 22. The memory management chip 25 is connected to the system bus 21 and controls direct memory access operations including, passing data between the RAM 24 and hard disk drive 26 and floppy disk drive 27 and between the RAM 24 and the cache 60. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions resident in the random access memory 24 of one or more computer systems configured generally as described above. These instructions could be contained within software profiling tools such as tprof as well as within the linker or other software programs used when assigning memory addresses to pinned routines and data structures, e.g., during the build process for an operating system kernel. Until required by the computer system, the set of instructions may be stored in another computer readable memory, for example, in the hard disk drive 26, or in a removable memory such as an optical disk for eventual use in the CDROM 32 or in a floppy disk for eventual use in the floppy disk drive 27. Further, the set of instructions can be stored in the memory of another computer and transmitted over a local area network or a wide area network such as the Internet when desired by the user.

One skilled in the art would appreciate that physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms of comparing or validating, or other terms that could be associated with a human operator. No action by a human operator is desirable in any of the operations described herein which form part of the present invention; the operations are machine operations processing electrical signals to generate other electrical signals.

The invention is applicable to any pair of memory units that are vertically adjacent in the memory hierarchy where the smaller memory unit is constrained by a mapping algorithm such that each location in the smaller memory unit may hold one of several, but not all, locations in the larger memory unit, but will be described below with reference to a particular illustrative embodiment for the purposes of clarity. The instance will be that of the so-called "main memory" and a single unified "cache" between the main memory and the CPU. However, the cache and main memories are only one instance of memories vertically adjacent in the memory hierarchy. In references in computer architecture, there can be found other examples of two vertically adjacent memory components within the hierarchy to which the invention would be equally applicable. For example, the invention is applicable to a cache on a disk controller card which holds sectors of hard disk data and is constrained by a mapping algorithm in terms of which sectors can be placed in specific cache locations.

The Central Processing Unit (CPU) will typically operate at speeds which are significantly faster than the main memory. As noted above, the speed of the memory determines the rate at which instructions or data can be fetched from the memory and delivered to the CPU for processing. Given the relative costs of the cache memory as compared to the main memory, the cache memory will be much smaller. It is therefore necessary to determine a means to use the memory locations of the cache memory for the temporary storage of portions of the content of the main memory and, on demand, to refill the cache memory locations with required instructions or data from the main memory.

As designed, each portion of the cache memory is typically used for the temporary storage of instructions or data from many different portions of the main memory. Similarly, each portion of the main memory may be allocated to one of a plurality of regions within the cache. However, particular portions of the cache memory are associated with the same portions of the main memory at all times. Therefore, given a main memory location or address, it is possible to predict all the cache memory locations where the contents of that main memory location could be placed when the cache memory is refilled on demand. This process of associating a cache memory location with several main memory addresses is referred to as "mapping." In other words, main memory locations "map" to cache memory locations and this mapping is fixed for a given machine main memory and cache size and design.

The cache memory is ordinarily designed today as a series of "planes" each one of which is used to map the entire main cache. The number of planes is called the "associativity" of the memory and a typical cache memory unit will have 4-way set associativity. This means that the cache memory is designed to work in such a manner that each memory location in main memory is associated with 4 different locations in the cache into which it can be mapped, or loaded as demanded by the CPU. Typically, the conceptual planes into which the cache is divided are called "cache plane 0," "cache plane 1," and so on up to the associativity of the cache minus one, e.g., "cache plane 3" for a 4-way set associative cache. Finally, the cache and main memory will have the same cache line or fetch size on which they operate. This will be a power of 2 and may range up to 128 bytes, although 32 bytes is perhaps the most common size. It is this line size which determines how many bytes of data are transferred from the main memory to the cache memory on demand and conceptually defines the "width" of the cache memory planes. The "height" of said planes is given by the total cache memory size divided by the associativity times the width.

This formula is expressed below mathematically:

$$\text{Height} = \text{Size}/(\text{Associativity} * \text{Width})$$

If a typical stored program digital computer system is examined with reference to the cache and main memories, where the main memory size is 64 MB (67,108,864= $2^{}26$ bytes) with a cache memory size of 256 KB (262,144=$2^{}18$ bytes) and supposing that this particular cache has 4-way associativity, the size of each cache plane is 65,536 bytes (=$2^{}16$). Each cache plane therefore maps the main memory a total of ($2^{}26/2^{}16$)=$2^{}10$=1024 times. The effect of this mapping is that each byte address in cache memory maps 1024 byte addresses in main memory. However, as noted above, the main memory contents are not fetched into the cache a byte at a time, but rather as sequential blocks of addresses. Assuming that the width of a block is 32 bytes gives a height for the cache planes of 2048 cache lines.

This description of the specific elements of a memory hierarchy will be used in the example below. Startup is ignored and it is assumed that the computer has reached a steady state. That is, there are programs running, which is to say that the CPU is fetching instructions and data from the cache, and the cache is filled with instructions and/or data and the CPU requires yet one more block of 32 bytes to continue execution of the program. At this point, using one of several alternative algorithms, the control hardware or firmware for the cache selects, from among the four planes at the appropriate address, one block of 32 bytes of instructions or data to be replaced or overwritten by the contents of main memory. The system then fetches 32 bytes from main memory and loads those bytes into the chosen plane of the cache at some address. As noted above, this address in the cache is not arbitrary, but rather is a specific function of the particular cache implementation and the main memory address of the 32 byte block containing the required instructions or data.

At this point, the problem addressed by this invention may arise. Since each of the cache planes map multiple addresses within main memory, the system must overwrite some of the bytes already in the cache to get the new bytes into the cache. However, if the instructions or data that were overwritten happen to be frequently accessed, the system has, in effect, solved a problem by creating a problem since, when the particular block of frequently accessed instructions or data are next needed, they will have to be re-fetched from main memory and will in turn overwrite something else in the cache. For a 4-way set associative cache, should it happen that five or more frequently accessed blocks of instructions or data each map to the same cache locations, the cache will begin to "thrash". Cache thrashing occurs when the system, due to the placement of frequently accessed instruction or data blocks in main memory, repeatedly invalidates and overwrites those instructions or data within the cache.

The effect of the cache on the speed of execution is best understood in terms of the effective speed of memory. Suppose the time it takes to fetch from one to 32 bytes from main memory is 80 ns and the time to fetch four bytes from the cache is 10 ns. Then, fetching and executing 32 sequential bytes of instructions, each 4 bytes in length, directly from the main memory will require 8*80 ns or 640 ns. However, using the cache and fetching one 32 byte block of instructions or data from main memory into the cache once takes 80 ns and the subsequent fetching of 7 instructions from the cache takes only an additional 70 ns for a total of 150 ns. This is about 4 times faster than the main memory fetches. In effect, assuming constant CPU speed, executing instructions from main memory will take 80 ns per instruction and fetching 8 instructions into the cache, with the first from main memory and the remaining 7 from the cache will take, on average, 18.75 ns per instruction. This figure is the effective memory speed assuming that a fetch from main memory is required and as shown above, it is more than 4 times faster than the main memory speed. However, if those code routines that are frequently accessed can be loaded into the cache and kept there, i.e. seldom or never overwritten, the execution time for those routines will be 80 ns or 10 ns per instruction. This is 8 times faster than main memory and almost twice as fast as the fetch and execute time. Similarly, frequently accessed data blocks that remain in the cache result in equivalent performance improvements.

Therefore, one is motivated to have the frequently accessed instructions and data in the cache and to keep them there. The invention described below does exactly that. The invention allows the CPU to demand fetch the frequently accessed routines and data structures. Once in cache, the invention will tend to keep those instructions and data in the cache as long as needed.

In determining which of the code routines should be considered, the invention considers two attributes: routine size and frequency of use. It should be clear why frequency of use is considered. The rationale for the criterion of size of the routines is equally straightforward. The amount of space in the cache is very limited. Since the overall effective speed of the memory hierarchy is to be maximized, it is necessary to take the size of the routines being loaded into the cache into account as well. The size of the routines determines how many will fit in the same amount of cache space. In terms of Table 1 below, the routines of the upper right quadrant, those that are small and frequently used are most important.

TABLE 1

| LARGE & HIGH USAGE | SMALL & HIGH USAGE |
|---|---|
| LARGE & LOW USAGE | SMALL & LOW USAGE |

Figure 2:
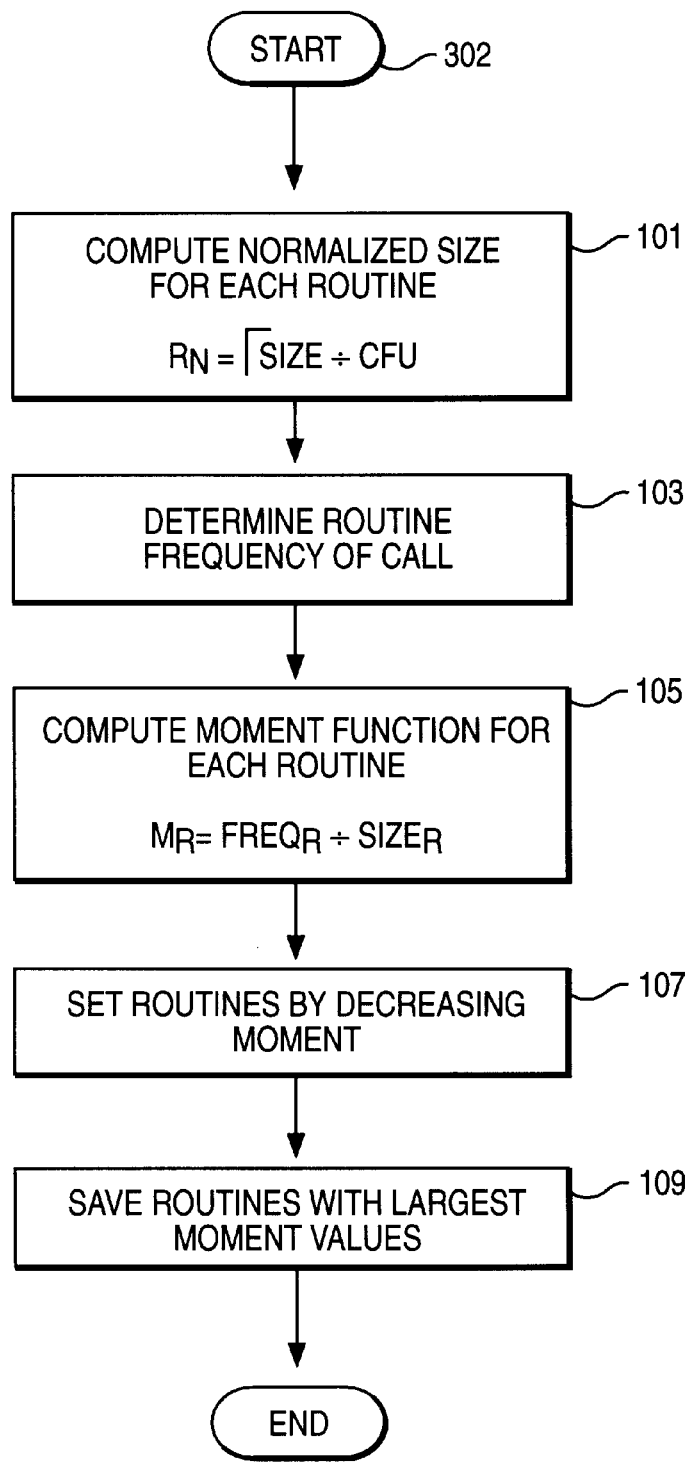
FIG. 2 is a flow diagram for the process of determining the moment of a routine according to the invention.

The first step is to order all the routines in the system under consideration, or a large subset thereof, both by usage and size. One of the preferred implementations for performing the Moment Function is as sets of instructions that comprise one or more computer programs running on a general purpose stored program digital computer. The program(s) could be invoked, for example, during the building of operating system kernels by development teams or during the tuning of such software by performance specialists. This can be performed by the Moment Function described below. When the routines in the system are ordered using this Moment Function, those with the largest values are the ones which are most important from an effective memory speed point of view. The process for performing the Moment Function is shown in FIG. 2. In step 101, for all the routines, R, in the system under consideration, compute a normalized size for each routine by dividing the routine size by the cache line size or the Cache_Fetch_Unit (CFU). This step may be performed by using any of the standard size measurement tools, which provide output similar to the values provided by the operating system linker routines. Since the size of the CFU is necessarily an integer, the ceiling of the routine size is taken in bytes over the CFU.

This formula is expressed mathematically:

$$Size(R) = ceiling(Routine\_Size/Cache\_Fetch\_Unit)$$

Next in step 103, the frequencies of call of the various routines are calculated. In one embodiment, the frequencies of call can be derived from any of the standard performance tools. The frequencies of call are highly dependent upon the application programs running on the stored program digital computer. Therefore, the best performance enhancement will be obtained by determining the frequencies of call of the various routines during activity that is characteristic of "normal" operation. It is typical that persons skilled in the art will be responsible for obtaining the calling frequencies via software tracing or profiling techniques.

Next, in step 105, the Moment Function for each routine is computed using the normalized sizes of the routines and the frequencies of call, R, by multiplying the frequency of usage by the inverse of the routine size determined in step 101. The inverse of the normalized size is used to force the moment function to maximize:

This formula is expressed mathematically:

$$Moment(R) = Freq(R)*1/Size(R) = Freq(R)/Size(R)$$

One skilled in the art would appreciate that there could be alternative moment functions. The formula above is just the one possible function. One could put exponential weights on the components, since the baseline Moment Function is a product:

$$Moment(R) = (Freq(R)**Weight)/Size(R)$$

where Weight is not equal to 1.0.

The baseline Moment Function above implicitly assumes that cache memory space and execution call frequency are of equal importance. It is possible and perhaps even likely that one or the other of these factors should be given more weight than the other.

Alternatively, one might have the Moment Function influenced by dependencies between routines. For example, if a small, frequently accessed routine always calls a specific larger routine, one might want to artificially inflate the large routine's Moment or decrease the small routine's Moment, or both, since they often execute together. There are many other possibilities. According to the invention, however, the size and frequency of execution should be factors.

Next, in step 107, the routines are sorted and stored based on their moment function values from largest to smallest. According to the invention, the value of the moment function is directly related to the effect each routine will have on the performance of the system. The computation of the moment function values concludes in step 109, where those routines with the lowest moments are discarded. The saved moment function data is used for input to the next algorithm.

This invention is applied only to routines that are frequently accessed. As the moment of a routine decreases, the importance of its placement in memory decreases accordingly. It is likely that diminishing returns would apply for most workloads. There is probably a point obvious to a human at which the algorithm should terminate. For an automated process, it is probably sufficient to stop the algorithm once the total amount of routines or data "mapped" is several times the size of the entire cache. For example, if the cache size is 512 KB, stopping the algorithm once 2 MB worth of the highest moment routines and data have been mapped may be deemed sufficient. However, there are pathological situations where it may be appropriate to stop the process much sooner or to let it run far longer. The applicants believe that this decision should be left in the hands of the people skilled in the art who are supervising the process.

An example of the output that is produced by the Moment Function is shown below in Table 2. In this example, data is only provided for the 16 most frequently used routines in a system with a 128 KB cache with 4-way associativity, i.e. each cache plane is 32 KB. Those skilled in the art would recognize that there would in all likelihood be many more routines.

TABLE 2

Sorted Routine Moment Function Values

| Routine | Freq(R) | Mem Size | Size(R) | Moment |
|---------|---------|----------|---------|--------|
| R12 | 458 | 128 | 4 | 114.500 |
| R09 | 637 | 256 | 8 | 79.625 |
| R10 | 541 | 464 | 15 | 36.067 |
| R04 | 878 | 772 | 25 | 35.120 |
| R06 | 721 | 668 | 21 | 34.333 |
| R02 | 1,000 | 1,000 | 32 | 31.250 |
| R07 | 707 | 944 | 30 | 23.567 |
| R03 | 900 | 1,344 | 42 | 21.429 |
| R08 | 684 | 1,400 | 44 | 15.545 |
| R01 | 1,340 | 3,884 | 122 | 10.984 |
| R05 | 763 | 2,952 | 93 | 8.204 |
| R11 | 472 | 2,348 | 74 | 6.378 |
| R13 | 373 | 3,996 | 125 | 2.984 |
| R15 | 181 | 2,192 | 69 | 2.623 |
| R14 | 246 | 4,000 | 125 | 1.968 |
| R16 | 22 | 512 | 16 | 1.375 |

The last column in the table indicates the magnitude of each routine's effect on cache performance. The larger the moment, the larger the effect on performance. It can be readily seen that the most frequently used routine is R01, but that routine ranks 10th in the Moment Function calculations.

Figure 3:
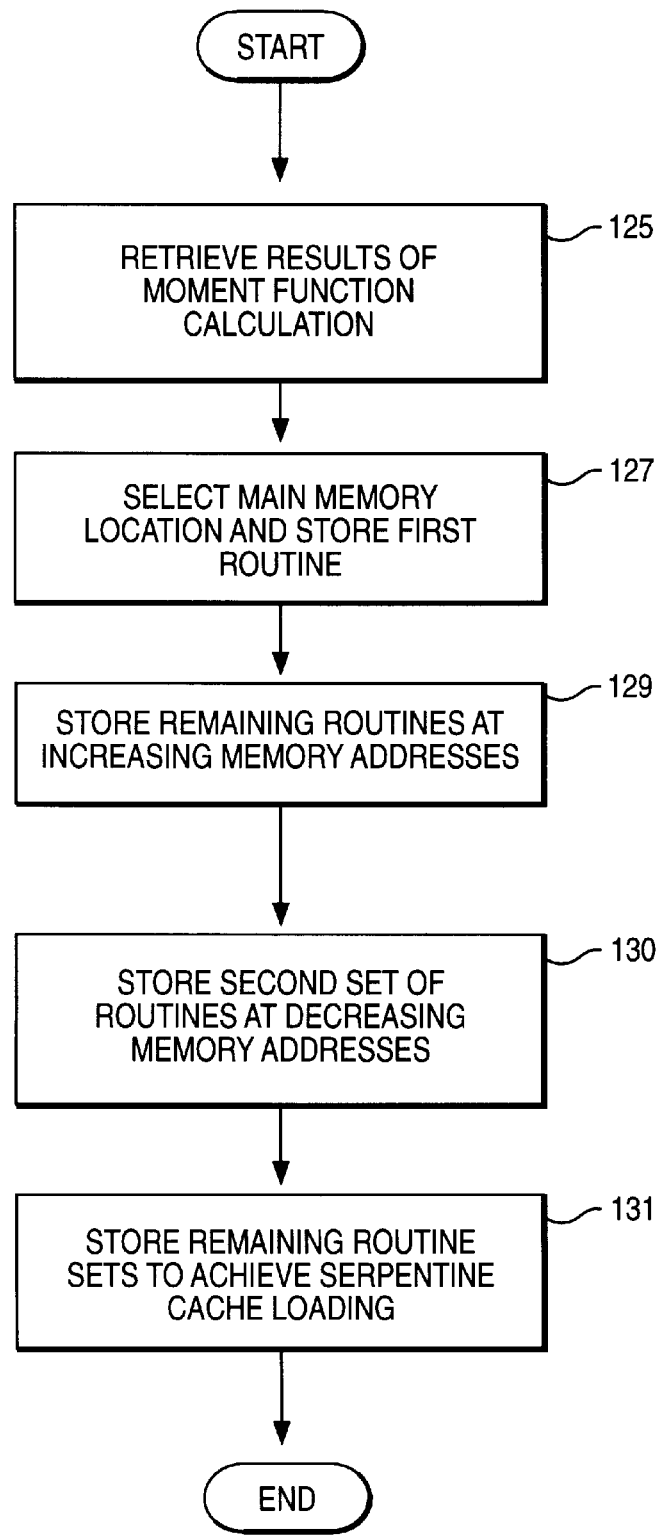
FIG. 3 is a flow diagram of the process for packing main memory according to the the calculated moments of routines.

Next, the calculated data from the moment function are used to pack the memory. This process is shown in FIG. 3 and described below. In step 125, the results of the moment function are retrieved. In step 127, a suitable location is chosen in main memory to begin placing the routines according to the results of the moment function. In particular, the first routine should be placed in main memory so that it maps to the lowest address in the cache according to the mapping used by the system in question. The placement of routines is performed by the compiler or the linker, and often some form of "pragma" is available that directs the compiler or linker as to where a routine should be located. In step 129, a plurality of the remaining routines, up to the size of one of the cache planes, 32 KB in the example above, are stored into main memory so that they will map to the cache in ascending order. Consistent with good boundary alignment practices for the particular computer in question, the linker should leave no or the smallest possible "holes" between the routines. In the Intel architecture, for example, the instructions are variable-sized and thus the smallest possible hole is zero bytes. However, there may be an advantage to aligning routines on cache block boundaries, to reduce the number of memory fetches and possible cache block flushes needed to execute a routine for the first time. This is an implementation-specific choice.

Conceptually, the first 32 KB of frequently accessed, small routines will "fill" a cache plane and remain in the cache because they are frequently accessed. This is because the main memory mapping to cache planes is many-to-k, where k is the cache associativity, and any given main storage block can be mapped into any one of the k different planes. In other words, any block from main memory can reside anywhere within the set of cache locations mapping the particular main memory address; and the number of elements in the set of cache locations is exactly the cache associativity. Each such set of k cache locations is termed a "congruence class". Thus, assuming a cache line replacement algorithm that tends to retain frequently accessed lines in each cache congruence class, other routines can use the other k-1 lines in the same congruence class.

In step 130, the second set of routines equivalent to one cache plane in total size according to the Moment Function, are stored into main memory. However, these routines are placed in main memory in a slightly different fashion to further reduce the statistical possibility of competition with the routines with the very highest moment values, i.e. those placed during the steps 127 and 129. Since the first set of routines were placed starting with the lowest cache addresses, the second set of routines is placed starting with the highest cache addresses. The starting cache address of each routine in the second set is therefore chosen such that the routine will end on the largest remaining cache address. Thus, the routines with the highest moment values from the first set compete only with the routines with the lowest moments from the second set. Again, consistent with good boundary alignment practices for the particular computer in question, the linker should leave no or the smallest possible "holes" between the routines.

In step 131, the remaining routines are placed in main memory so that each cache plane's worth of routines are placed in a direction opposite that of the previous set.

To place the routines into the main memory so that the cache will be loaded in a "serpentine manner" is perhaps most easily understood if the routines or data of the system under consideration are thought of as grouped into cache plane sized sets, in order according to their moment values. Then, taking the set of routines with the largest moment values, the first byte of the routine with the largest moment value is placed at a main memory address such that the cache fetch algorithm will load that byte into line 0 of cache plane 0 and the subsequent bytes of the routine into successive cache lines as required. The first byte of the next routine is placed at a convenient main memory address so that it will be loaded into the next unused cache line. This process is continued until all the routines in the set have been placed into main memory.

The set of routines with the next largest moment values are now taken and the routine with the largest moment value is placed into main memory so that its last byte will be loaded into the last byte of the last cache line of plane 1 by the fetch mechanism. Then, the next routine is placed at a convenient location in memory so that its last byte will be loaded into the last unused cache line. This process, of placing the sets of routines into main memory with ascending addresses and sets of routines with decending addresses, is continued until all the routines under consideration have been placed into main memory.

It will be appreciated by those skilled in the art that this process, which has been described in terms of plane 0 and plane 1, is only a convenience for description and that the cache fetch algorithm may load any of the main memory routines which have been described as being placed so that they would be fetched into a particular plane into any of the cache planes. Furthermore, it will also be understood that while this process was described as beginning at a memory location that will load into cache line 0 and the last cache line, it may be begun at a memory location mapping to any cache line, provided that the change of direction occurs when all the routines of a given set have been placed. This will cause the cache to be loaded in a serpentine manner. While the serpentine pattern is unique to the invention, the "pragmas" or their equivalent will accomplish this ordering. The compiler or linker merely has to pay attention to the given ordering.

Figure 3A:
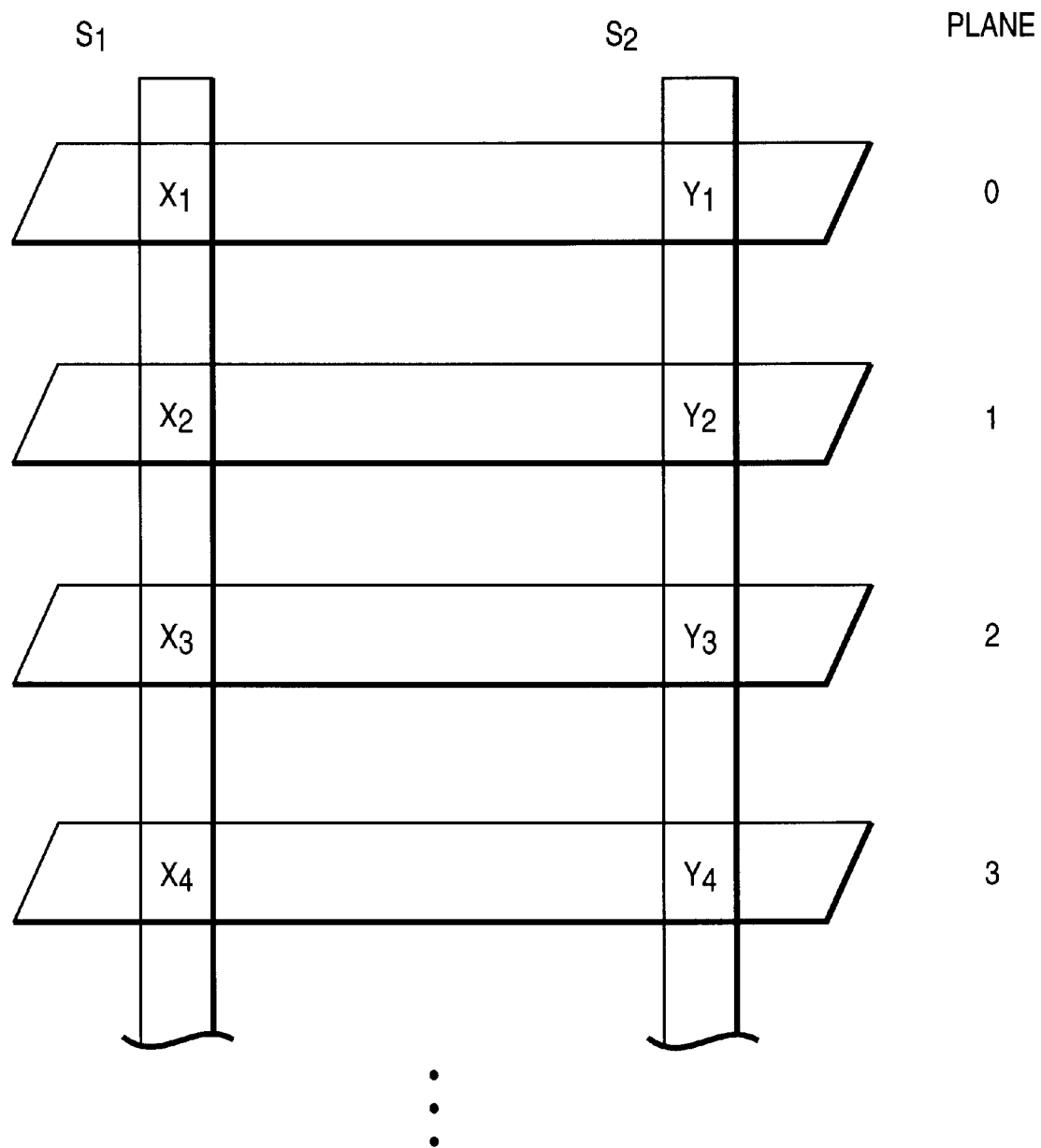
FIG. 3A shows a vertical slice through several cache planes to illustrate balanced packing in the cache.

The routines with the largest moments are the ones that should be protected as much as possible from competition for cache space. However, each of the routines being packed is in itself important, so they should be balanced throughout the cache. In effect, this means that, for every vertical slice though the several cache planes, the sum of the moment values of the routines contained in that slice should substantially equal the sum of the moment values of the routines in any other slice. Doing so assures that the frequently used routines are less, rather than more, likely to collide and hence will tend to remain in the cache. This is shown in FIG. 3A.

This figure shows a cache filled with routines that have been fetched from main memory. The routines were placed in main memory so that the cache was filled in the (idealized) serpentine manner as taught by the inventors in this application. In the figure, the routines with the largest moments have been loaded into the top plane beginning at cache line 0 (on the left) and continuing in the serpentine manner through plane 3. Also shown are "slices" through the four planes which pass through several of the routines that have been loaded into the cache. Since these routines have been sorted by their Moment Values and placed into main memory so that they would be fetched into the cache in a serpentine manner, the sum of the Moment Values of the routines intercepted by the left-most slice will be approximately equal to the sum of the Moment Values of the routines intercepted by the right-most slice. And, giving due consideration to the actual magnitudes of the Moment Values, whenever main memory has been loaded so as to produce a cache image that is serpentine, the cache will demonstrate this consistency of sum for all slices.

The inventors call this placement of routines into main memory in a fashion that will cause the alternative planes of the cache to be loaded in opposite directions, "serpentine".

FIG. 4 shows a worksheet used to map the 16 example routines given above into a 32 KB 4-way set associative cache. The mapping algorithm between main memory addresses and cache addresses is assumed to be a simple 8 KB modulo of the main memory address. Thus, main memory addresses 0, 8192, 16384, 24576, 32768, etc., all map to cache address 0, and thus fall within the same cache congruence class. So, for example, routine R12 can be located in main memory starting at main memory address 0 or 8192 or 16384 or 24576 and it will satisfy the algorithm begin described. The remaining nine routines of the first set are placed in main memory with addresses such that the routines will map into subsequent cache congruence classes, as shown in the figure.

It should be noted that as the main memory is packed so that the cache interference among the high frequency routines would be as small as possible, there are some "holes" in the cache. In mapping the first set of routines, for instance, the cache addresses above 6975 are not yet the target of any frequently accessed routines. In such a case, the holes can be filled by placing other small, frequently accessed routines into main memory so that when fetched into the cache, they would fill the holes. The selection of the best hole-filling routine(s) could be handled by a complex heuristic or through simple well-known algorithms such as "first-fit" or "best-fit." In any case, the algorithm should attempt to fill the hole as completely as possible using unplaced routine(s) with the largest computed Moments. Doing so will further improve the performance of the system, especially if the routines used have a large moment function.

The invention described above for the placement of frequently accessed routines in a cache for instructions can be used for the placement of frequently accessed data structures in a cache for data. In a very similar manner, the size and the frequency of access of various pinned data structures can be obtained and a Moment Function calculated. The data structures can be laid out in main memory in a similar serpentine fashion, with a similar hole-filling algorithm to maximize the performance benefits.

Furthermore, for a unified cache containing both instructions and data, frequently accessed routines and data structures can be considered as equivalent entities and can be laid out in a combined fashion, provided that a compatible Moment Function is utilized for both.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for improving performance of a computer system having a faster memory unit and a slower memory unit, wherein memory locations of the faster memory unit are shared by a plurality of memory locations of the slower memory unit, comprising the steps of:

determining the frequency of access of a plurality of routines in the system;

determining the size of each of the plurality of routines;

associating with each routine a Moment Value computed according to the size of each routine and the frequency of access of the routine;

sorting the Moment Values and the associated routines in descending order in a sorted Moment Value list so that the routine with the largest Moment Value is first in the sorted Moment Value list; and arranging the associated routines in the order of decreasing Moment Value at memory locations in the slower memory unit of the computer;

so that the performance of the program running on the computer system is improved by reducing contention for memory space in the faster memory unit among the plurality of routines.

2. The method as recited in claim 1 further comprising the steps of:

finding the frequency of access of routines in an application program;

normalizing sizes of the routines by computing a numerical value for each routine which will be equal to a memory size of the routine divided by a cache fetch unit size;

adjusting the normalized size, if necessary, by rounding up to the nearest multiple of the cache fetch unit size; and using this normalized value as input to the computation of the Moment Value.

3. The method as recited in claim 1 wherein the size of each routine is determined by a system linker.

4. The method as recited in claim 1 wherein the routines are arranged at least in part by a compiler program.

5. The method as recited in claim 1 further comprising the steps of:

identifying available locations in the faster memory unit that are not fully mapped by the routines from the slower memory unit;

determining sizes of the available locations of higher speed memory;

identifying from the sorted Moment Value list, those routines that will fit into the available locations having larger Moment Values than such other routines that will fit into the available areas; and storing the identified routines that will fit into the available locations in the slower speed memory in such a manner that the available areas of higher speed memory will be utilized by the identified routines.

6. The method as recited in claim 1 wherein smaller, more frequently accessed routines have larger Moment Values than larger, less frequently accessed routines.

7. The method as recited in claim 1 wherein the routines are arranged in the slower memory so that if fetched the routines having the largest Moment Value are loaded in the faster memory in a serpentine fashion.

8. A method for improving performance of a computer system having a faster and slower memory unit, wherein memory locations in the faster memory unit are shared by a plurality of memory locations of the slower memory unit and comprising the steps:

associating a Moment Value with each datum of a plurality of data, each Moment Value computed according to a size of the datum and a frequency of access of the associated datum;

sorting the Moment Values and the associated data in descending order so that the datum with the largest Moment Value is first in the list; and arranging the associated data in the order of decreasing Moment Value in the slower memory unit;

so that performance of the programs running on the computer is improved by reducing the contention among the more frequently accessed data for memory space within the faster memory unit that is used solely for data.

9. The method as recited in claim 8 wherein the associating, sorting and arranging steps are also performed on a set of routines so that contention among the routines and data is reduced for the memory in the faster memory unit which is used for both routines and data.

10. A computer system comprising:

a faster memory unit;

a slower memory unit;

means for mapping a plurality of memory locations in the slower memory unit to each memory location in the faster memory unit;

means for arranging routines from a program in the slower memory unit in order of decreasing Moment Value, wherein a Moment Value of each routine is calculated according to a size of routine and a frequency of access of the routine;

so that the performance of the program running on the computer system is improved by reducing contention for memory space in the faster memory unit among the routines.

11. The system as recited in claim 10 wherein the routines are arranged at least in part by a compiler program.

12. The system as recited in claim 10 wherein smaller, more frequently accessed routines have larger Moment Values than larger, less frequently accessed routines.

13. The system as recited in claim 10 wherein the routines are arranged in the slower memory so that if fetched the routines having the largest Moment Values are loaded in a serpentine fashion.

14. A computer program product on a computer readable medium for use by a computer system having a faster memory unit, a slower memory unit and a means for loading routines stored in the computer readable medium, comprising;

a set of routines in a computer program;

a set of pragmas each associated with a particular routine which instruct the loading means to load the set of routines in the slower memory unit in an order of decreasing Moment Value, wherein a Moment Value of each routine is calculated according to a size of the routine and a frequency of access of the routine so that the performance of the program running on the computer system is improved by reducing contention for memory space in the faster memory unit among the routines.

* * * * *